United States Patent
Van Walraven

(10) Patent No.: US 8,047,476 B2
(45) Date of Patent: Nov. 1, 2011

(54) PIPE CLIP HAVING A CURVED FLANGE

(75) Inventor: Jan Van Walraven, Mijdrecht (NL)

(73) Assignee: J. van Walraven Holding B.V., Mijdrecht (NL)

( * ) Notice: Subject to any disclaimer, the term of this patent is extended or adjusted under 35 U.S.C. 154(b) by 229 days.

(21) Appl. No.: 11/965,376

(22) Filed: Dec. 27, 2007

(65) Prior Publication Data

US 2009/0026766 A1    Jan. 29, 2009

(30) Foreign Application Priority Data

Dec. 27, 2006 (NL) ...................................... 1033138

(51) Int. Cl.
*F16L 3/08* (2006.01)
(52) U.S. Cl. ...................... 248/74.4; 248/74.1; 248/74.3; 248/72; 248/58; 248/61; 248/63
(58) Field of Classification Search ............... 248/65, 248/67.5, 74.4, 74.1, 74.3, 72, 58, 49, 61, 248/62, 63
See application file for complete search history.

(56) References Cited

U.S. PATENT DOCUMENTS

| 1,063,852 | A | * | 6/1913 | Middleton | .................... 248/74.4 |
| 2,397,279 | A | * | 3/1946 | Le Vesconte | ................. 248/74.3 |
| D489,000 | S | * | 4/2004 | Ellery | ............................. D8/396 |
| 7,325,776 | B2 | * | 2/2008 | Shibuya | .......................... 248/62 |

FOREIGN PATENT DOCUMENTS

| DE | 33 08 459 A1 | 9/1984 |
| DE | 85 03 846 U1 | 5/1985 |
| DE | 100 03 183 A1 | 8/2001 |
| EP | 0 225 516 A2 | 6/1987 |
| FR | 2 571 465 A1 | 4/1986 |

* cited by examiner

*Primary Examiner* — Nkeisha Smith
(74) *Attorney, Agent, or Firm* — Browdy and Neimark, PLLC

(57) ABSTRACT

A pipe clamp for supporting pipes consists of an open sheet-metal strip surrounding the pipe and of a rubber sleeve which is inserted between the pipe and the sheet-metal strip. The two ends of the sheet-metal strip are connected to one another in the assembled state by means of a clamping screw. The pipe clamp consists only of the sheet-metal strip and of the clamping screw, the two strip ends being bent somewhat radially outwards, forming two screw lugs, and the clamping screw being supported, in the pre-assembled state, on a screw lug such that it cannot be lost and is ready for assembly.

8 Claims, 4 Drawing Sheets

PIPE CLIP HAVING A CURVED FLANGE

BACKGROUND OF THE INVENTION

The invention relates to a pipe clip for fastening a pipe to a wall, ceiling or another support. Such a pipe clip comprises a clip body with an opening for attaching the pipe clip around the pipe, which opening is delimited by a first end of the clip body and a second end of the clip body. A first outwardly extending flange is formed integrally with the first end and a second outwardly extending flange is formed integrally with the second end. A tightening element comprising a head and a shank connects the first and second end of the clip body. The head of the tightening element engages with the first end of the clip body and the shank of the tightening element engages with the second end.

For example, DE 40 15 404 discloses a pipe clip wherein the pipe clip has at one end a flange which is provided with a bore provided with a screw thread The screw thread is screwed into this bore and is fixed in relation to the flange. The pipe clip has at the other end a flange with a recess which is open on the side remote from the clip body. The recess in the flange has a width which is greater than the diameter of the head of the tightening screw. An arresting mechanism is attached to the side of the flange that is facing away from the other flange. The arresting mechanism is a separate component which is pivotably fastened to the clip body. The arresting mechanism has a recess which is open on the side facing away from the clip body and which has a width smaller than the diameter of the tightening screw During closing of the clip, the head presses against the arresting mechanism and ensures the pivoting of the arresting mechanism for the play required to bring the head of the tightening screw along the edge of the arresting mechanism in order subsequently to engage with the head behind the edges of the recess of the arresting mechanism, the shank of the tightening screw being received in the recess.

SUMMARY OF THE INVENTION

The object of the invention is to provide a simplified pipe clip.

According to the invention, this object is achieved by means of a pipe clip comprising a clip body with an opening for attaching the pipe clip around a pipe, which opening is delimited by a first end of the clip body and a second end of the clip body A first outwardly extending flange is formed integrally with the first end and a second outwardly extending flange is formed integrally with the second end The pipe clip furthermore comprises a tightening element comprising a head and a shank, the head of which tightening element engages with the first end of the clip body and the shank of which tightening element engages with the second end The first flange is curved with a relatively large radius of curvature in such a way that the free end of the flange extends substantially in the radial direction and the other end of the first flange merges seamlessly in the tangential direction of the clip body. A recess is formed in the first flange for the shank of the tightening element and there is formed in the clip body a recess which adjoins the recess in the first flange and through which the head of the tightening element fits. The clip body is configured resiliently, at least in proximity to the first end. All this is in such a way that when in use, during closing of the pipe clip, the head of the tightening element is pressed against the side of the first flange that faces the second flange, the clip body is shaped and deformable in such a way that the head of the tightening element is able to slide along the flange in the direction of the recess in the clip body. When the head projects into the recess in the clip body, the clip body recoils, as a result of which the shank of the tightening element is received in the recess in the flange and the head of the tightening element engages behind the edges of the recess in the first flange.

The pipe clip according to the invention does not require any separate components because of the deformability of the clip body and the forming of a guide face by the side of the first flange that faces the second flange, which guide face guides the head of the tightening element toward the recess intended for this purpose in the clip body when the pipe clip is pressed tight. The pipe clip can thus be manufactured simply and inexpensively. A further advantage is that the free end of the first flange is closed, in contrast to the flange from, for example, DE 40 15 404, as a result of which the flange is stronger.

Preferred embodiments of the pipe clip according to the invention are defined in the dependent claims.

The invention will be explained in greater detail with reference to the drawing.

DESCRIPTION OF THE PREFERRED EMBODIMENT

Figure 1:
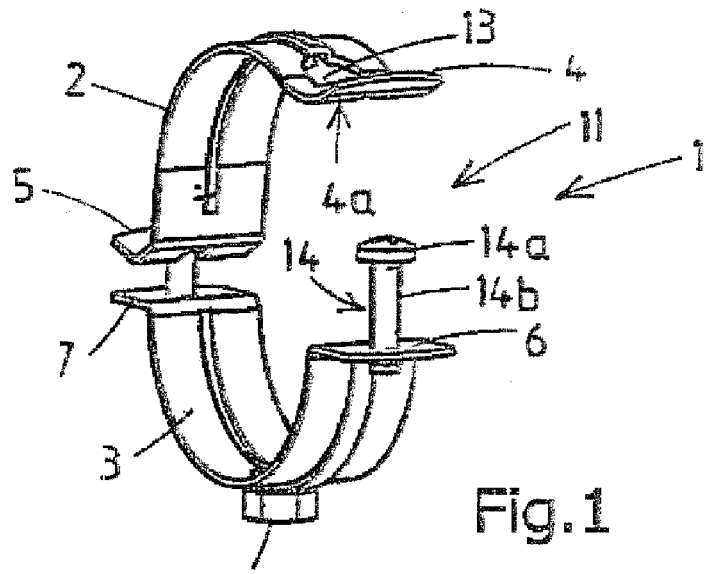
FIG. 1 is a perspective view of a preferred embodiment of a pipe clip according to the invention when opened.
Figure 2:
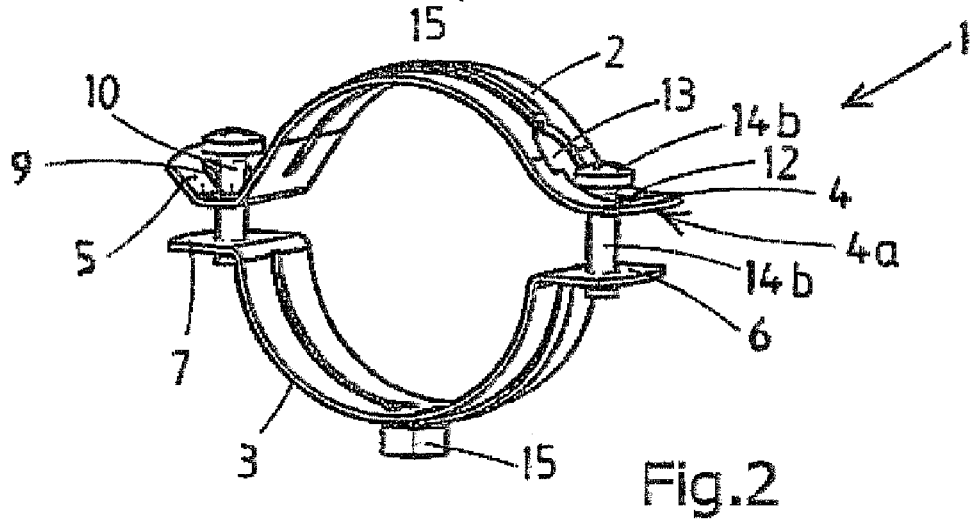
FIG. 2 is a perspective view of the pipe clip from FIG. 1 during closing thereof.
Figure 3:
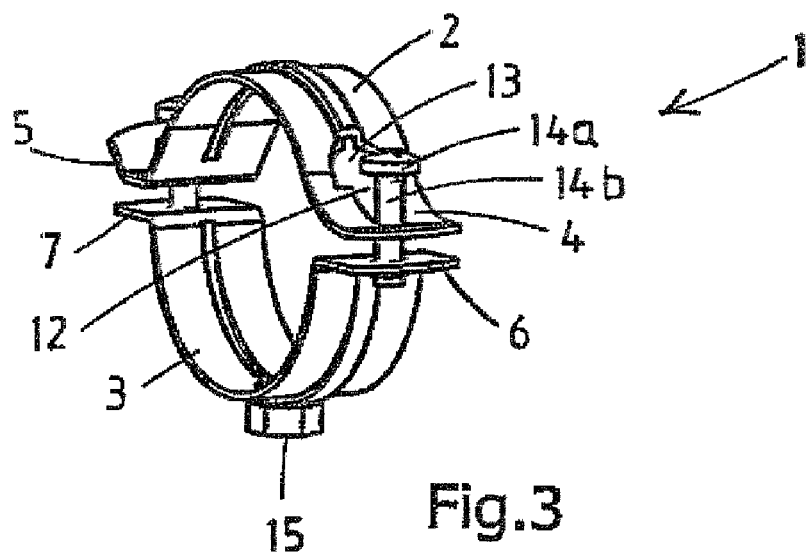
FIG. 3 is a perspective view of the pipe clip from FIG. 1 when closed.

FIGS. 1-3 show a pipe clip 1 with a metal clip body comprising two clip halves 2 and 3 respectively. The first clip half 2 is provided at both ends with a flange 4 and 5 respectively. The second clip half 3 is provided at both ends with a flange 6 and 7 respectively When fitted, the flange 4 of the first clip half 2 opposes the flange 6 of the second clip half 3, and the flange 5 of the first clip half 2 opposes the flange 7 of the second clip half 3

The second clip half 3 is provided on its outside with a nut 15 with which the pipe clip 1 can be suspended from a threaded end or the like. The nut 15 is fastened to the clip half 3, for example, by welding.

The flanges 6 and 7 in the second clip half 3 are configured identically and provided with a screw hole. The flange 5 of the first clip half 2 is provided with a slotted hole 9.

When fitted, a tightening screw 10 is inserted through the elongate hole 9 in the first clip half 2 and inserted into the screw hole in the flange 7 of the second clip half 3. The flange 5 of the first clip half 2 is bent away from the flange 7 of the second clip half 3; this allows, in conjunction with the elongate hole 9, the clip halves 2 and 3 to be hinged open, an opening 11 being enlarged on the diametrically opposite side in such a way that the pipe clip 1 can be attached around a pipe.

Per se, it is also possible to use another hinge construction in order to connect the clip halves, for example with an integrally formed T-shaped end part on one clip half and a slotted hole on the other clip half such as is known, for example, from EP 597 193. The clip body could also be of one-piece configuration, the clip body being sufficiently flexible to allow the opening 11 to be made sufficiently large to attach the pipe clip around a pipe.

The flange 4 of the first clip half 2 is curved with a relatively large radius of curvature. The free end of the flange 4 extends substantially in the radial direction. The other end of the flange 4 merges seamlessly in the tangential direction of the first clip half 2 of the clip body.

The flange 4 is provided with an elongate recess 12. Attached to the end of the elongate recess 12 that is remote from the free flange end is an adjoining recess 13 extending in the curved body portion of the first clip half 2. The recess 13 is wider than the elongate recess 12 in the flange 4

When fitted, the flange 4 of the first clip half 2 is tightened against the flange 6, which is provided with a screw hole, of the second clip half 3 by means of a tightening screw 14. The recess 13 in the clip body enables the head 14a of the tightening screw 14 to be fed therethrough. The elongate recess 12 is narrower than the head 14a of the tightening screw 14 but sufficiently wide to receive the shank 14b of the tightening screw 14.

The first clip half 2 of the clip body is configured resiliently.

During use, the clip halves 2 and 3 are connected to each other in a hinging manner by means of the tightening screw 10 or in another manner. The tightening screw 14 is screwed into the screw hole in the flange 6 of the second clip half 3. During fitting, the pipe clip is hinged open in the manner described hereinbefore and the pipe clip is attached around a pipe. Subsequently, during closing of the pipe clip 1, the head 14a of the tightening screw 14 is pressed against the side 4a of the flange 4 that faces the flange 6. The first clip half 2 of the clip body is deformed by the compressive force in such a way that the head 14a of the tightening screw 14 slides along the side 4a of the flange 4 in the direction of the recess 13 in the clip body. When the head 14a of the tightening screw 14 projects into the recess 13 in the clip body, the first clip half 2 recoils, as a result of which the shank 14b of the tightening screw 14 is received in the elongate recess 12 in the flange 4 and the head 14b of the tightening screw 14 engages behind the edges of the elongate recess 12 in the flange 4. The clip 1 is then closed around the pipe. The tightening screws 10 and 14 can then be tightened in order to tighten the clip halves 2 and 3 around the pipe.

Figure 4:
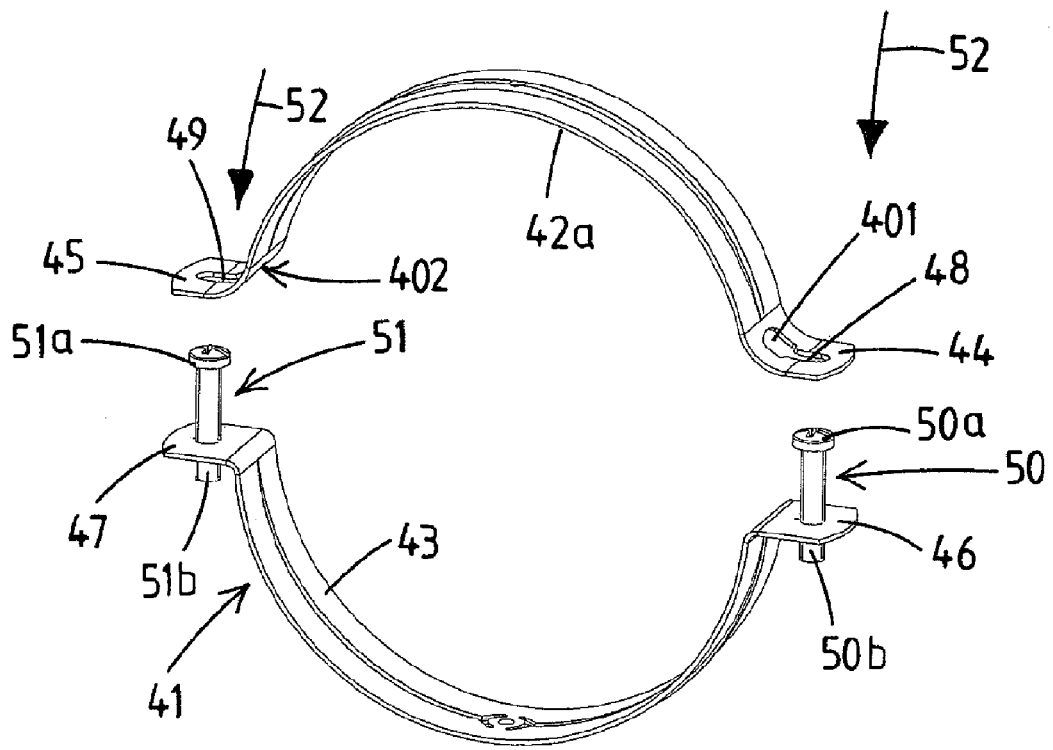
FIGS. 4, 5, 6A-6C, and 7 are front views of another preferred embodiment of a pipe clip according to the invention during different stages of assembly.

FIG. 4 shows a different pipe clip 41 with a metal clip body comprising two clip halves 42 and 43 respectively. The first clip half 42 is provided at both ends with a flange 44 and 45 respectively. The second clip half 43 is provided at both ends with a flange 46 and 47 respectively. When fitted, the flange 44 of the first clip half 42 opposes the flange 46 of the second clip half 43, and the flange 45 of the first clip half 42 opposes the flange 47 of the second clip half 43.

The second clip half 43 has in each of the flanges 46 and 47 a screw hole into which a tightening screw 50 and 51 respectively is screwed. The first clip half 43 has in the flanges 44 and 45 respectively a recess 48 and 49 respectively for the shank of the respective tightening screws 50 and 51. Formed in the clip body, in the first clip half 42, is a recess 401 and 402 respectively which adjoins the recess 48 and 49 respectively in the flanges 44 and 45 respectively and through which the head 50a and 51a respectively of the tightening screw 50 and 51 respectively fits.

Figure 5:
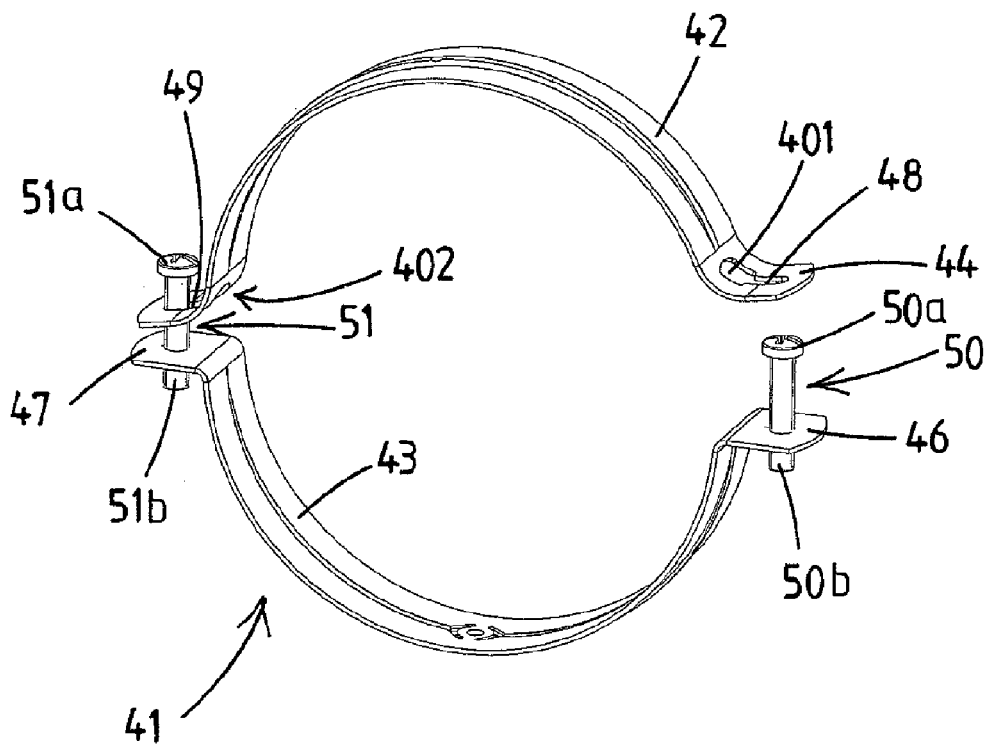
Figure 6A:
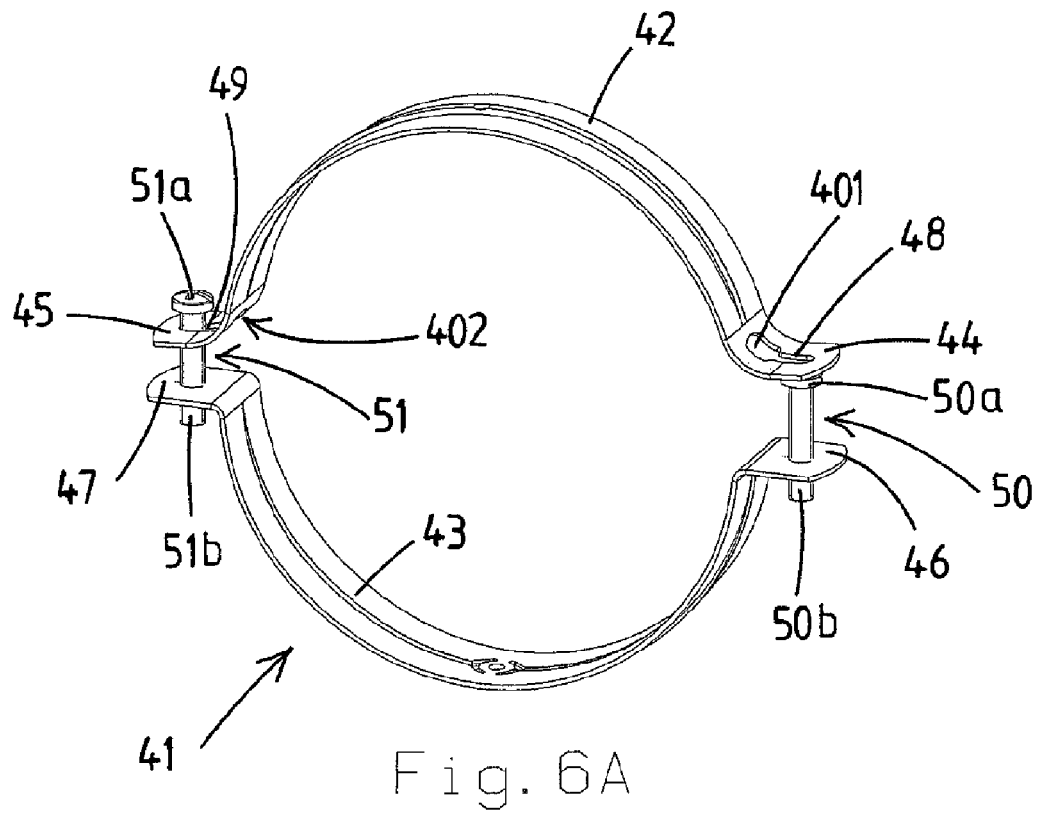
Figure 6B:
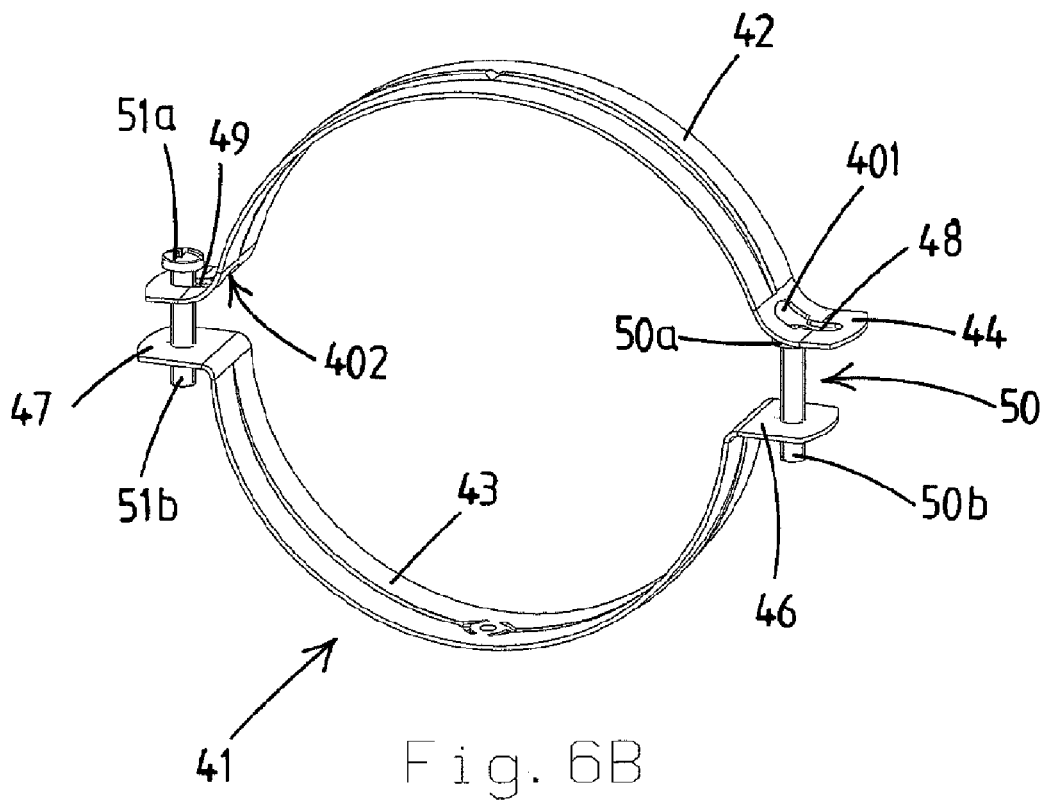
Figure 6C:
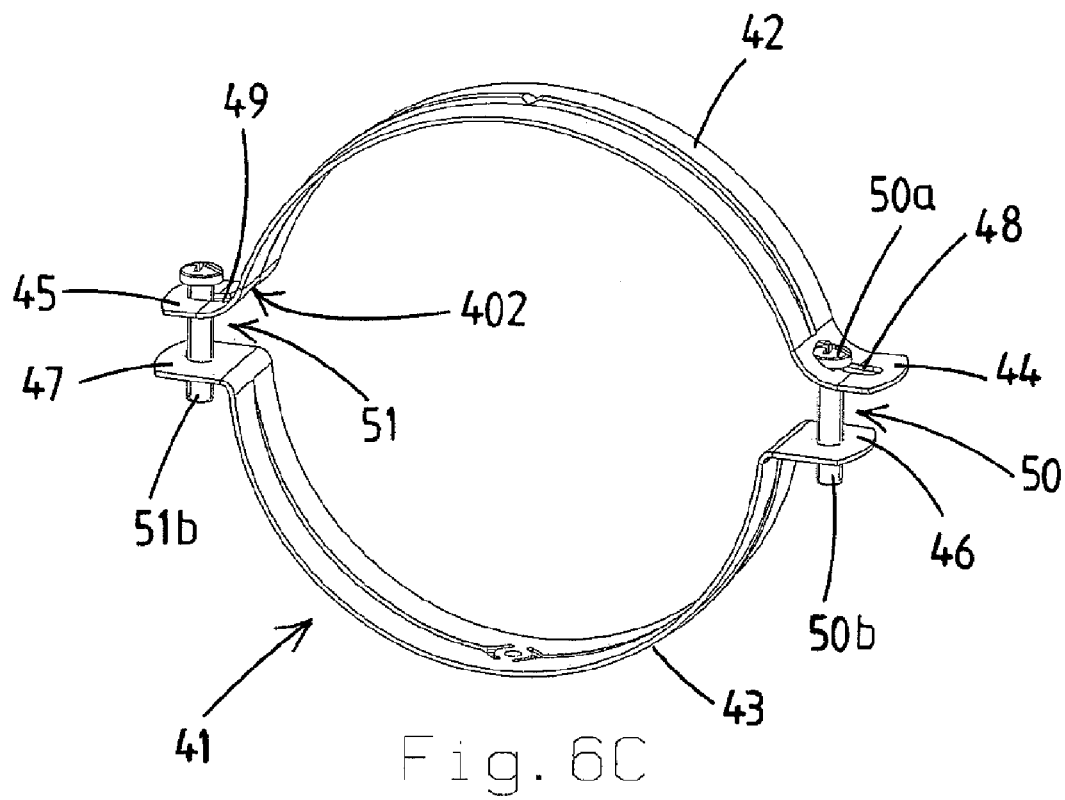
Figure 7:
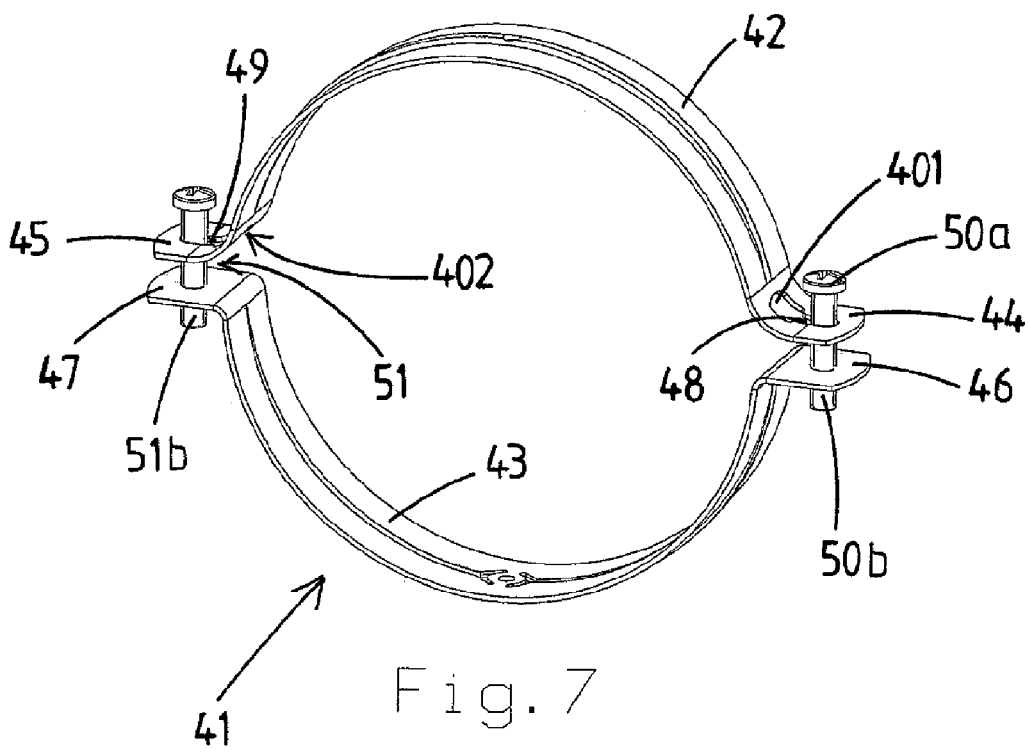

In FIG. 4, the first clip half 42 is represented in a non-connected state. The arrows 52 illustrate the direction of movement when the first clip half 42 is placed on the second clip half 43 and around a pipe (not shown). As is shown in FIG. 5, the screw head 51a is inserted through the broader recess 402 after which the clip half 42 is shifted such that the shank 51b is received in the elongate opening 49. The flange 44 of the clip half 42 is placed against the head 50a of the tightening screw 50. The exertion of further pressure causes the clip half 42 to become deformed, the flange 44 being moved outward, as is illustrated in FIGS. 6a-6c. In the figures, the flange 44 is shown in various positions during the outward movement. In the position moved furthest outward (FIG. 6c), the head 50a can be inserted through the opening 401, after which the clip half 42 can recoil, wherein the shank 50b of the tightening screw 50 can be received in the elongate opening 48. The clip halves 42 and 43 are then connected to each other by means of this quick-acting closure. Subsequently, the tightening screws 50 and 51 can then be tightened in order to tighten the clip halves 42 and 43 around the pipe.

The pipe clip 41 shown in FIG. 4 has the advantage that the clip halves 42, 43 can be packaged loose and, for example, nested one within the other, so less free space is necessary in the packaging. However, the fitter does not have to screw the pipe clip halves 42, 43 together prior to use. This is particularly advantageous in the case of pipe clips for pipes having relatively large diameters.

In one embodiment (not shown) comparable to that in FIG. 4, the pipe clip comprises two identical clip halves. Each clip half then has on one side a flange comparable to the flange 46, 47 and on the other side a flange comparable to the flange 44, 45. In this way, merely one type of clip half has to be manufactured, and this is beneficial in the light of production costs. After manufacture, one of the clip halves can be provided with a nut, a screw hole or the like in order to be able to suspend the pipe clip from a threaded end or the like.

Two specific preferred embodiments have been shown hereinbefore. However, it will be understood that the features mentioned in the description and shown in the figures of these specific preferred embodiments must not be interpreted as being restrictive. Alternative embodiments with features which have been altered or adapted in relation to the embodiments shown specifically in the present document are conceivable and come under the scope of the invention defined in the claims.

What is claimed is:

1. A pipe clip for fastening a pipe to a wall, ceiling or another support, comprising:
    a clip body with an opening for attaching the pipe clip around the pipe, which opening is delimited by a first end of the clip body and a second end of the clip body,
    a first outwardly extending flange having a free end and another end formed integrally with the first end,
    a second outwardly extending flange having a free end and another end formed integrally with the second end,
    a tightening element comprising a head and a shank, the head of which tightening element engages with the first end of the clip body and the shank of which tightening element engages with the second end,
    wherein the first flange has a curved guiding surface on a side of the flange that faces the second flange,
    wherein the first flange is curved with a relatively large radius of curvature in such a way that the free end of the first flange extends substantially in a radial direction and the another end of the first flange merges seamlessly in a tangential direction of the clip body,
    wherein a recess having edges is formed in the first flange for the shank of the tightening element and there is formed in the clip body an introduction recess which adjoins the recess in the first flange and through which the head of the tightening element fits such that the shank of the tightening element can be introduced in the recess in the first flange, the clip body being configured resiliently, at least in proximity to the first end in such a way that when in use, during closing of the pipe clip when the head of the tightening element is pressed against the curved guiding surface of the first flange, said guiding surface slides along the head of the tightening element, whereby the clip body is deformed and the introduction recess in the clip body is toward the head and when an edge of the introduction recess has moved beyond the head of the tightening element, the clip body recoils, as a result of which head of the tightening element moves through said introduction recess and the shank of the tightening element is received in the recess in the first flange and the head of the tightening element engages behind the edges of the recess in the first flange.

2. The pipe clip according to claim 1, wherein the second flange is provided with a hole which is provided with a screw thread and into which the shank of the tightening element is screwed.

3. The pipe clip according to claim 1, wherein the clip body comprises two clip halves which are connected to each other in a hinging manner.

4. The pipe clip according to claim 1, wherein the clip body comprises a first clip half having a first end and a second end, and a second clip half having a first end and a second end, wherein the first flange is attached to the first end of the first clip half and the second flange is attached to the first end of the second clip half, and wherein a further flange is attached to the second ends of the first and the second clip half, which flanges are connected to each other by means of a second tightening element.

5. The pipe clip according to claim 4, wherein the first clip half is provided with two similar flanges with which the heads of respective tightening elements engage, and the second clip half is provided with two similar flanges with which the shanks of the respective tightening elements engage.

6. The pipe clip according to claim 5, wherein the flanges of the first clip half and accompanying recesses in the flanges and in the clip body portion of said clip half are identically shaped.

7. The pipe clip according to either claim 5 or claim 6, wherein the flanges of the second clip half are identically shaped.

8. The pipe clip according to claim 4, wherein the first clip half is configured in a same way as the second clip half with a flange with which the head of one of the tightening elements engages and a flange with which the shank of another one of the tightening elements engages.

\* \* \* \* \*